US007051159B2

(12) United States Patent
Dayan

(10) Patent No.: US 7,051,159 B2
(45) Date of Patent: May 23, 2006

(54) METHOD AND SYSTEM FOR CACHE DATA FETCH OPERATIONS

(75) Inventor: Richard A. Dayan, Wake Forest, NC (US)

(73) Assignee: International Business Machines Corporation, Armonk, NY (US)

(*) Notice: Subject to any disclaimer, the term of this patent is extended or adjusted under 35 U.S.C. 154(b) by 381 days.

(21) Appl. No.: 10/609,753

(22) Filed: Jun. 30, 2003

(65) Prior Publication Data
US 2004/0268047 A1 Dec. 30, 2004

(51) Int. Cl.
G06F 12/00 (2006.01)
(52) U.S. Cl. .................... 711/118; 711/137; 711/135; 711/144
(58) Field of Classification Search ............. 711/118, 711/135, 144, 138, 137
See application file for complete search history.

(56) References Cited

U.S. PATENT DOCUMENTS

| 4,500,954 A | * | 2/1985 | Duke et al. ................ 711/138 |
| 4,882,642 A | * | 11/1989 | Tayler et al. ............ 360/78.11 |
| 4,942,518 A | * | 7/1990 | Weatherford et al. ....... 711/138 |
| 4,962,451 A | | 10/1990 | Case et al. ................ 364/900 |
| 5,715,421 A | * | 2/1998 | Akiyama et al. ........... 711/213 |
| 5,845,308 A | | 12/1998 | Dockser ...................... 711/3 |
| 5,883,640 A | | 3/1999 | Hsieh et al. ................ 345/503 |
| 6,044,437 A | | 3/2000 | Reinders .................... 711/122 |
| 2004/0003179 A1 | * | 1/2004 | Shirahige et al. ........... 711/137 |
| 2004/0049640 A1 | * | 3/2004 | So et al. ..................... 711/137 |

* cited by examiner

Primary Examiner—Pierre Bataille
Assistant Examiner—Sheng-Jen Tsai
(74) Attorney, Agent, or Firm—Patrick J. Daugherty; Driggs, Hogg & Fry Co., LPA

(57) ABSTRACT

A cache controller structure and method are provided for managing cache access for a computer system. The computer system has a processor having a direction flag and configured to run a repetitive string operation, wherein the string operation is configured to sequentially access a targeted memory block for each repetition depending on the state of the direction flag. A cache controller logic is provided to control a cache embedded in the processor while the processor executes string operations. The cache controller is configured to manipulate the cache lines responsive to the direction flag and to a position of a targeted memory block within a cache line. In some embodiments, the controller logic is also configured to manipulate the cache lines responsive to a repetition parameter value within the string operation.

17 Claims, 5 Drawing Sheets

METHOD AND SYSTEM FOR CACHE DATA FETCH OPERATIONS

FIELD OF THE INVENTION

The present invention is related to computer data management and, in particular, to the management of data in cache memory systems.

BACKGROUND OF THE INVENTION

In order to improve system speed and efficiency, it is well known to incorporate "cache" systems in computer systems. A cache is a hardware device or system configuration that enables a computer, or a computer network, to temporarily store copies of data subject to repetitive processing by the system, wherein the data copies can be accessed much more quickly from the cache than the original data from its permanent location.

In general, a cache is typically used by a computer to store a temporary copy of data stored in another memory location, enabling faster access than system memory look-up and retrieval architecture. The memory structures incorporated within computer systems typically include a memory cache which comprises buffer storage that contains instructions and data frequently accessed by one or more processors in the system, and provides faster access to data resident in the memory cache than in another memory location. Caches are typically constructed of cache lines which are boundaries between blocks of storage that map to a specific area in the cache. The cache lines are usually made up of a plurality of words having adjacent addresses. In order to provide a transactional advantage, the temporary copy in the cache should be data that has a high probability of being requested by the computer system. Therefore, cache systems are managed to predict future data requests and, accordingly, retrieve that data and copy it to the cache. Some prior art cache controllers select recently accessed data for cache storage, in anticipation that it will be soon be requested again. Similarly, some cache systems select data immediately adjacent to the most recently accessed data for cache storage, in anticipation that it is highly likely to be accessed in the immediate future.

Although caches provide significant advantages over RAM, remote server storage and other system memory resources for repetitive data operations, computer system economies necessarily limit cache sizes. It is thus desirable to efficiently manage cache resources to quickly free up cache resources for new data copies by providing for a means to efficiently identify and "flush" old data from the cache. Typical prior art cache management systems rely upon cache access history methods to chose the cache line to be flushed; assuming that the oldest data in the cache is most likely to be stale, the data that has been accessed the farthest in the past relative to the other cache lines is flushed to make room for new data when the cache is full. However, this assumption is simplistic, and does not value other characteristics which may indicate that the oldest data is nevertheless more likely to be requested than some newly cached data.

Another well known method for cache memory management is to take advantage of the locality of either data or command data fetches. For example, a common technique used to perform repetitive operations is to use a programming construct known as a "Do loop". If the loop is rather small in the number of instructions to be repeated, it is likely that the entire loop can be contained in a single cache line. As such, repetitive execution of the loop will remain in the cache due to the close proximity or locality of the instructions in the memory address space to each other, thus achieving the fastest possible access to memory for the instructions.

What is needed is an improved cache management system to more efficiently and effectively cache data for system needs, by providing an improved means for identifying data most appropriate for caching. What is also needed is an improved means for prioritizing and identifying data most appropriate for flushing from the cache.

SUMMARY OF THE INVENTION

A cache controller structure and method are provided for managing cache access for a computer system. The computer system has a processor having a direction flag and configured to run a repetitive string operation, wherein the string operation is configured to sequentially access a targeted memory block for each repetition depending on the state of the direction flag. A cache controller logic is provided to control a cache embedded in the processor while the processor executes string operations. The cache controller is configured to manipulate the cache lines responsive to the direction flag and to a position of a targeted memory block within a cache line. In some embodiments, the controller logic is also configured to manipulate the cache lines responsive to a repetition parameter value.

DESCRIPTION OF THE PREFERRED EMBODIMENTS

Figure 1:
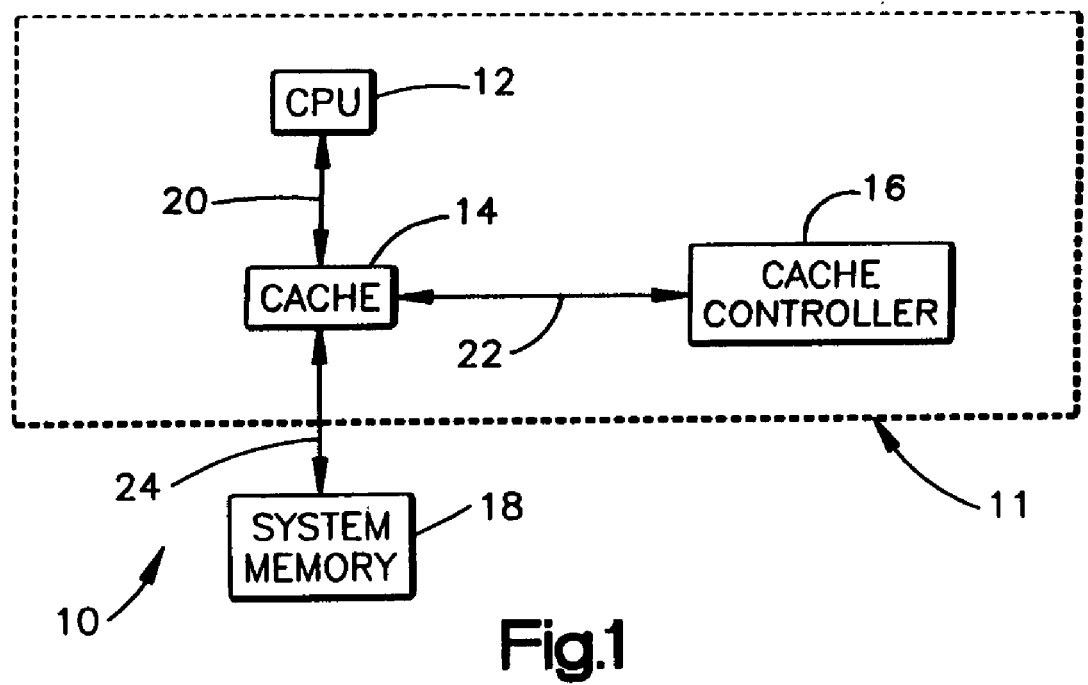
FIG. 1 is a block diagram of a processor-based computer system which includes cache controller logic constructed according to the principles of the present invention.

A block diagram of a computer system 10, which incorporates the present invention, is provided in FIG. 1. The system 10 comprises a microprocessor 11 with a CPU 12, an embedded processor cache 14 and cache controller logic 16; and an external system memory structure 18. The CPU 12 and embedded cache 14 communicate through a bus 20 with a preferred width of 128 bytes. The cache 14 and cache controller logic 16 communicate through a control bus 22. The size and characteristics of the control bus 22 are determined by the needs of the cache policy implemented, as is well known in the art. The external memory 18 is connected to the microprocessor 11 through a data bus 24, which preferably has a width of 32 bytes. The system elements shown may represent a variety of computer systems, but the invention is particularly useful in systems having an architecture which supports an Intel Corporation "x86"-type processor and its associated communications protocol.

The cache 14 is a special purpose buffer storage device which is smaller and faster than the system memory 18. The cache 14 is used to hold a copy of data and instructions obtained from the system memory 18 which are likely to be needed next by the processor 11. The data and instructions likely to be contained in the cache 14 are those which are frequently accessed by the processor 11, thereby serving to reduce the access time which would otherwise be required if the processor were to go to the main system memory 18 for the data or instructions. As used herein, data, instructions and operands are referred to generally as "data".

Computer system cache controllers typically process blocks of data by handling them in discrete data units known as "cache lines", wherein the size of the cache line is chosen responsive to the cache system requirements. Cache line lengths are typically some integral multiple of the computer system data bus width. For example, in a system with a thirty-two bit wide data bus 20, typical cache line sizes include sixteen or thirty-two bytes wide. A thirty-two bit wide data bus 20 can accommodate four bytes (wherein each byte is equivalent to eight bits) or one doubleword (which is equivalent to four bytes), depending on the type of processor used. Of course, other bus widths, cache line sizes and configurations of a cache line are contemplated by the present invention, and the invention is not limited to the embodiments described herein.

When the system memory 18 is accessed for a data operation, the cache controller 16 checks to see if the targeted data is resident in the cache 14. If the cache controller 16 does not find the address of the requested data in the cache 14, then the data is not in the cache 14 and a "cache miss" operation is indicated. If the cache controller 16 does find the address of the requested data in the cache 14, then the data is in the cache 14 and a "cache hit" operation is indicated. In a cache miss operation, the cache controller 16 supplies the targeted data from memory 18 to the processor 11 and then brings an entire cache line containing a targeted memory into the cache 14 a doubleword at a time until the entire line is present.

The present embodiment of the invention is implemented inside the processor 11 with an embedded internal cache 14 and an embedded internal cache controller 16. This is consistent with a write back or write through cache policy. It is to be understood that other embodiments may utilize external caches (not shown), such as L3 cache units. Similarly, it is not required that the cache controller logic 16 be embedded or internal to the processor 11. What is required is that the cache controller 16 has access to the processor flag, and in some embodiments the flag and count register contents.

Some processors, such as those based upon the Intel Corporation x86 computer architecture, support repetitive string operations. A string operation is one where the processor performs the same operation repetitively and serially upon a contiguous string of bytes or words.

The x86 architecture also provides the capability to change the direction of repetitive string operations such that memory addresses are decremented instead of incremented. The selection of incrementation or decrementation memory access is dependent upon the algorithm used in the specific application program being run. For example, operating systems typically load themselves from the high end of a memory buffer to the low end. In this case, the cache controller logic of the present invention will recognize this and manage the cache accordingly. String types of operations would defeat most advantages provided by a cache or hierarchy of caches in a system independent of the direction of the operation. This invention provides a cache support mechanism to help manage cache line fills during string operations memory access in order to maintain the benefits provided by the cache during typical string operations, and improve overall system performance.

In the x86 architecture, there are certain operations that can be repeated if a repeat prefix, such as REP or REPNE, is found in the instruction string at the beginning of one of the specified instructions. The number of repeated operations is determined by the count in the count register ("CX register"). The repeated operation updates the address in memory based upon the data width of the operation, i.e. byte or word after each individual operation which is obtained from the actual instruction used.

In the present invention, the address can either be incremented or decremented based upon the state of the processor's direction flag (DF). The DF is set according to one of two possible instructions. In the first, a CLD instruction is used to clear the state of DF to a zero (0), which tells the processor to increment memory access during a repeated instruction. In the second, an STD instruction is used to set the state of the DF to a one (1). This informs the processor to decrement memory access during a repeated instruction.

The following instructions are well known to those skilled in the art and are illustrative of repeatable memory operations appropriate for use with the present invention: MOVS, CMPS, SCAS, LODS or STOS instructions.

The present invention proposes a flexible data, cache line fill policy that takes into account repeated memory string operations including the current state of the DF. In a preferred embodiment, the invention is implemented in data-only caches and combined data and instruction caches. The invention is not intended to be used with instruction-only caches, as instruction fetch control typically must remain in the domain of a processor "prefetch" policy. Accordingly, the instruction fetch control may contain branches back to the code previously executed. Also, since instructions are never executed "backwards", but only in an incremental direction, there is no advantage gained by designing cache control logic dependent upon directional indicators. Thus, the present embodiment of the invention as described herein would not provide significant performance advantages gained if used in an instruction only cache.

An important advantage of the present invention is the identification and response by the cache controller to "boundary conditions". For example, in the present embodiment, the cache management logic determines whether to perform a cache line fill on a cache miss operation, or a premature flush cache line on a cache hit operation, responsive to parameters including the position of a targeted memory within a cache line, directional flags and string repetition values.

Figure 2:
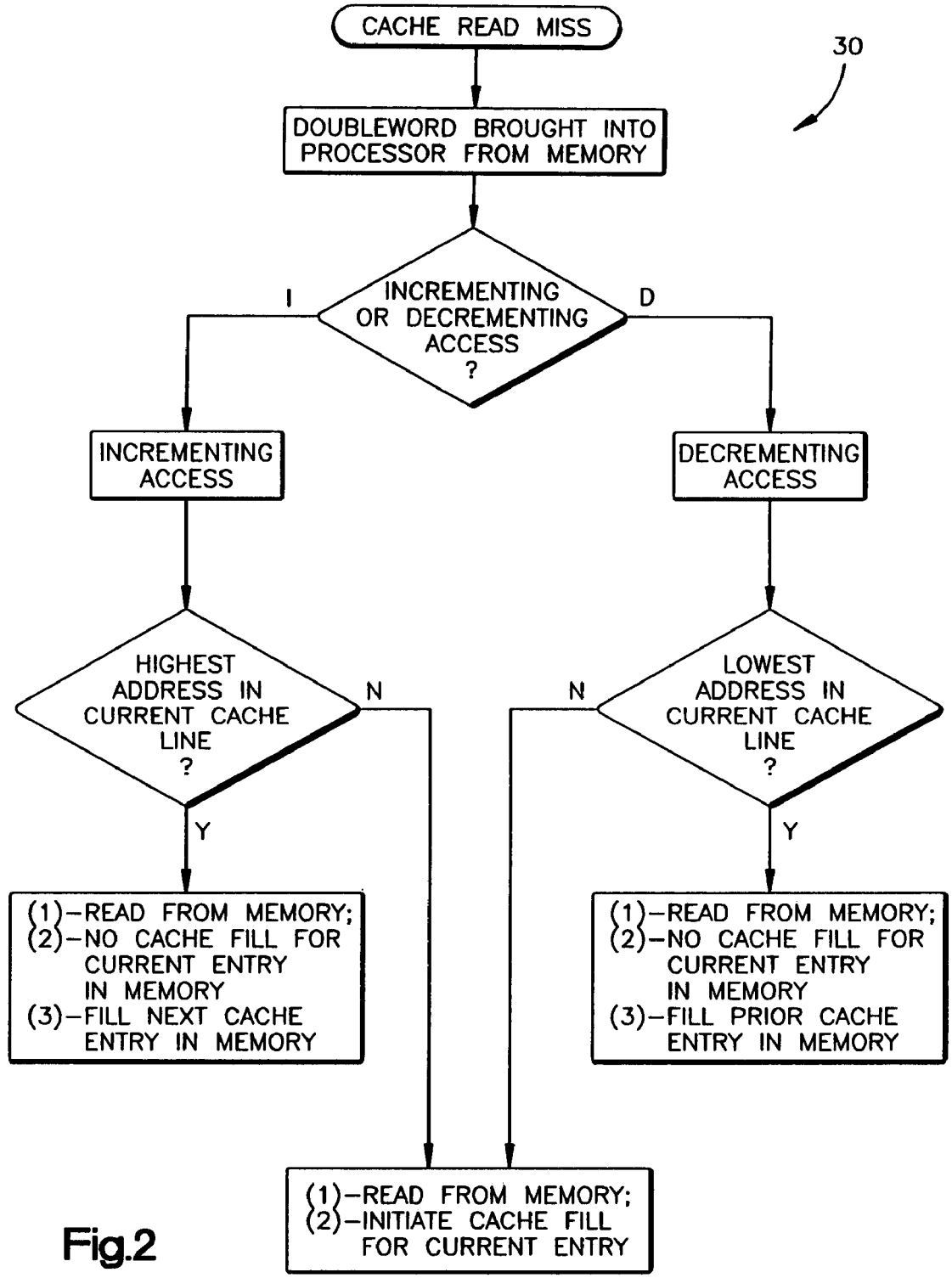
FIG. 2 is a block diagram of the cache controller logic for managing a cache read miss operation according to the principles of the present invention.

Read Miss. FIG. 2 is a block diagram illustration of the behavior of one embodiment of a cache controller logic 16 according to the present invention for a read miss operation 30. The read miss operation 30 is initiated when an addressed doubleword containing a string read operation targeted memory is not present in the cache 14. It is then brought into the processor 11 from the system memory 18. The controller logic 16 then determines the DF indicator for the string operation. If the DF indicates an incrementing address operation, then the targeted memory's address is compared to determine whether it is the highest address in the current cache line in memory. Alternatively, if the DF indicates a decrementing address operation, then the targeted memory's address is compared to determine whether it is the lowest address in the current cache line in memory. If neither condition is met, then the controller logic 16 behaves as a typical prior art cache controller and initiates a cache fill operation of the current data cache line, as the next repetitive operation will be in this same cache line. This is normal behavior for a typical prior art cache controller system.

What is new is that if either condition is met, then a boundary condition is indicated. The next string operation must necessarily involve the next cache line, as determined by the direction flag. Therefore, if the DF indicates an incrementing address operation and the targeted memory's address is the highest address in the current cache line in memory, then there is no cache fill for the current targeted memory address cache line, and instead the next (or higher) cache line from system memory 18 is filled into the cache. Similarly, if the DF indicates a decrementing address operation and the targeted memory's address is the lowest address in the current cache line in memory, then there is no cache fill for the current targeted memory address cache line, and instead the previous (or lower) cache line from system memory 18 is filled into the cache. Independent of the state of the DF, there is no reason to complete the filling of the current cache line from system memory 18, since the string operations will no longer need this line. Instead, the present invention prefetches the next or previous cache line, resulting in a read hit for the next string operation, in contrast to the prior art cache which would have loaded the present line and thus returned a read miss. This is a significant improvement over prior art cache fill determinations.

Figure 3:
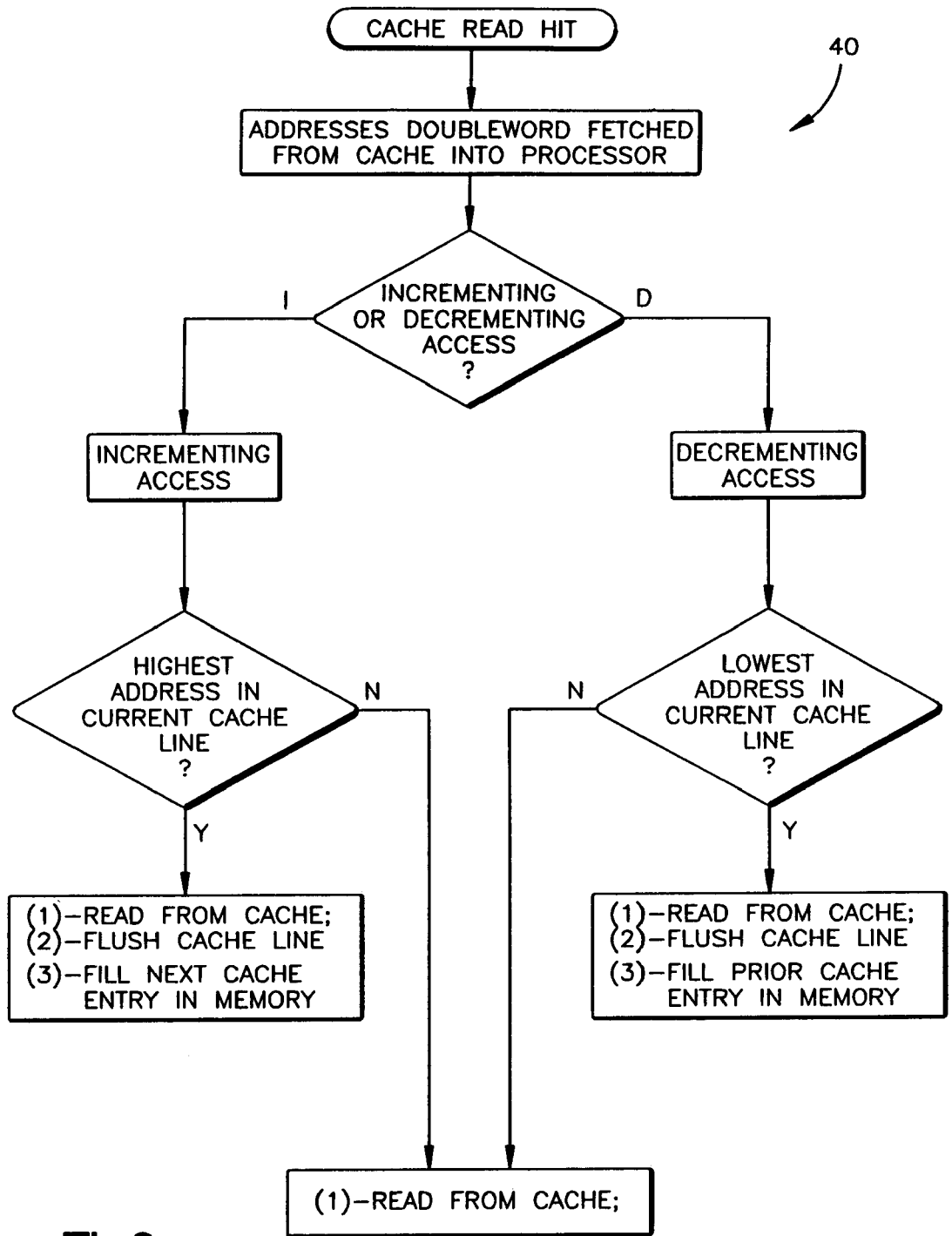
FIG. 3 is a block diagram of the cache controller logic for managing a cache read hit operation according to the principles of the present invention.

Read Hit. FIG. 3 is a block diagram of a read hit operation 40 according to the present invention. On a read hit, an addressed doubleword containing a targeted memory is fetched from the cache into the processor. As above in the "read miss" operation, the cache controller of the present invention checks to see if this is either the high address in the current cache line for incrementing access or the lowest address in the current cache line for decrementing access responsive to the DF. If neither condition is met, then the cache controller 16 behaves like a prior art cache and leaves the line in the cache for the next operation. What is new is that if the boundary conditions are met (where the DF indicates incrementing access and the target is the highest address in the cache line, or where the DF indicates decrementing access and the target is the lowest address in the cache line), the targeted cache line is flushed. Thus, an empty cache line is provided for the next fill operation. In contrast, depending on the particular cache flush policy, a prior art cache would probably value the read hit cache line high, perhaps higher than all others because it has been most recently read, another line would have to be flushed that may still be useful. But since we are decrementing/incrementing, we know that this line is now worthless once the last targeted address has been read, and we know we can flush it and bring in the next or prior cache line in sequence.

Figure 4:
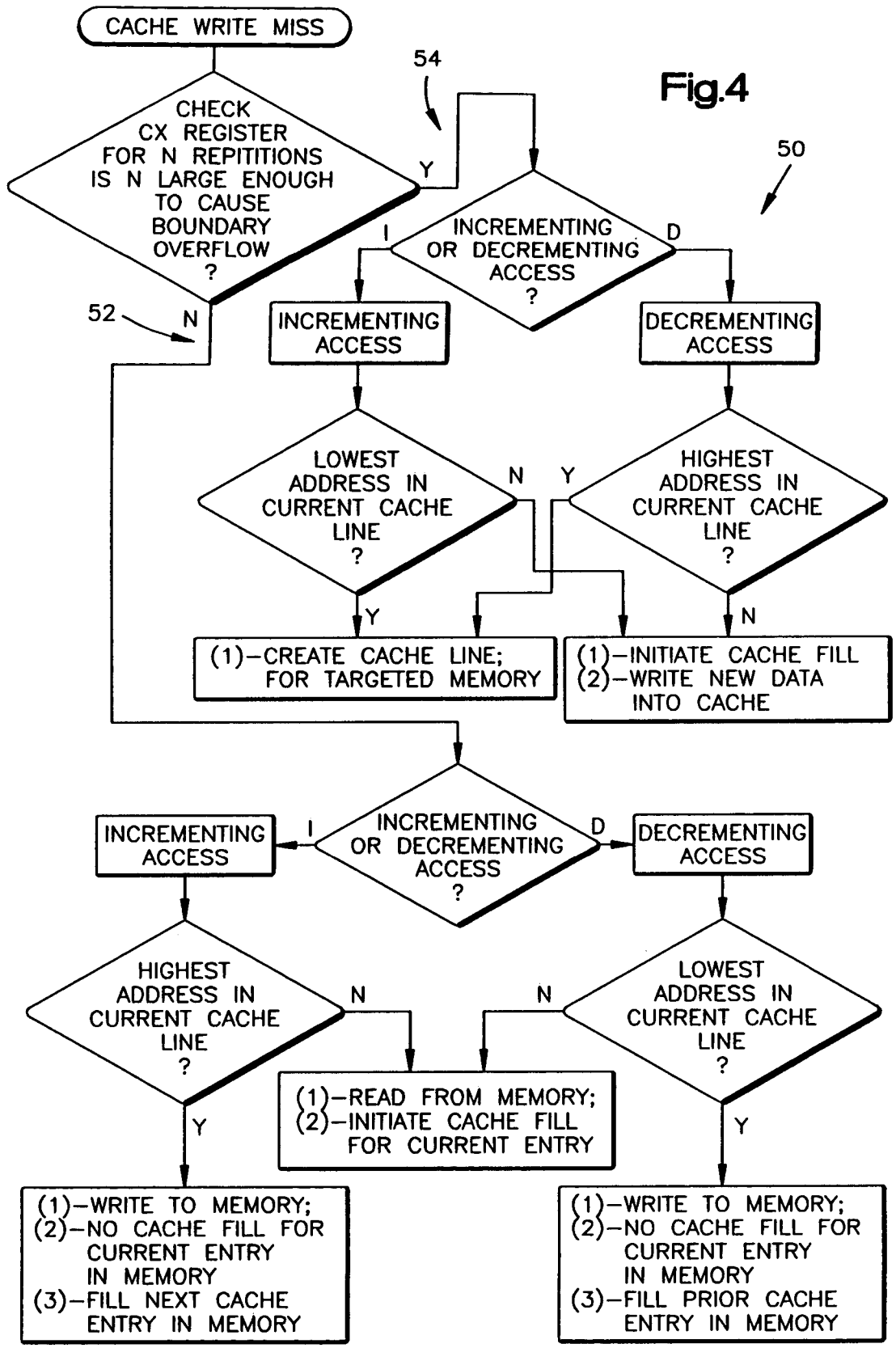
FIG. 4 is a block diagram of the cache controller logic for managing a cache write miss operation according to the principles of the present invention.

Write Miss. FIG. 4 is a block diagram of a write miss operation 50 according to the present invention. Here, two boundary conditions are used to indicate different cache operations. In the first, the cache controller 16 checks the CX register for the number of remaining repetitions to perform in the present string operation. If there are not enough repetitions to cause a memory access into the next adjacent cache line in memory, then the first boundary condition has not been met and step 52 initiates a first cache controller write miss behavior; wherein, depending on the state of the DF, the cache controller 16 fetches the cache line from memory 18, then updates the targeted memory in the cache line and marks the cache line as dirty when using a write back cache policy. If the DF indicates an incrementing address operation and the targeted memory's address is the highest address in the current cache line in memory, then the data is written directly to memory, and there is no cache fill for the current targeted memory address cache line, and instead the next (or higher) cache line is filled into the cache. Similarly, if the DF indicates a decrementing address operation and the targeted memory's address is the lowest address in the current cache line in memory, then the data is written directly to memory and there is no cache fill for the current targeted memory address cache line, and instead the previous (or lower) cache line is filled into the cache.

There is no reason to fill the current cache line, since the string operations will no longer need this line. Instead, the present invention prefetches the next or previous cache line, resulting in a write hit for the next string operation, in contrast to the prior art cache which would have loaded the present line and thus returned a write miss on the next operation. This is a significant improvement over prior art cache fill determinations.

Alternatively, if the CX register indicates that the number of remaining repetitions to perform in the present string operation are large enough to cause a memory access into the next adjacent cache line in memory, then the first boundary condition has been met and step 54 initiates a second cache controller write miss operation; wherein, if this is the lowest address in a cache line for an incrementing access, or the highest address for a decrementing access, a cache line is created but not filled in the cache representing the targeted address, and the modified data is placed in the cache. Other data in the new cache line is marked as invalid until written.

If the write miss is to an address that is neither the lowest or highest address within a cache line, then the cache line in memory must be filled prior to writing the new data into the cache line.

An important advantage of the present invention is that reading the data from memory 18 is not necessary, as a repeat string operation that writes to memory will change all the data in the line without reading it and without interventions (with the exception of interrupt handlers). This is new behavior for a cache.

Figure 5:
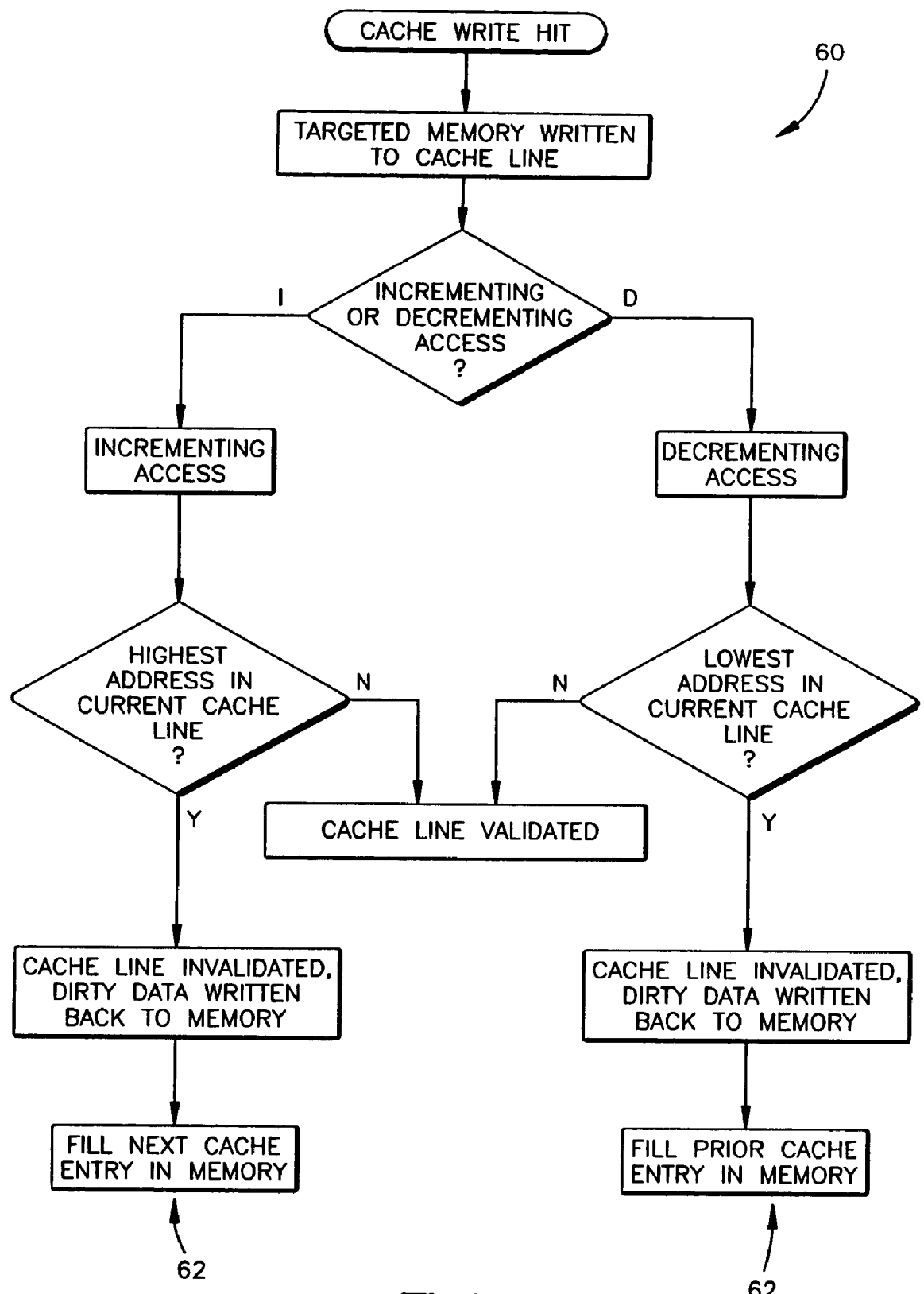
FIG. 5 is a block diagram of the cache controller logic for managing a cache write hit operation according to the principles of the present invention.

Write Hit. FIG. 5 is a block diagram of a write hit operation 60 according to the present invention. On a write hit, the targeted memory is written into the cache line in the cache 14. The address is checked to see if it is the lowest address in the cache line for decrementing operations. If it is, the cache line is invalidated and flushed, and any dirty data is written back to memory. If it is not the lowest, address, the cache controller leaves the line in the cache. On incrementing operations, the address written to is checked to see if it is the highest address in a line. If it is, the cache line is invalidated and flushed, and any dirty data is written back to memory. Invalidating and flushing the cache line on a boundary condition is new behavior, and an important advantage of the present invention. It provides an empty cache line for the next fill operation without requiring a cache line to be flushed that may still be usable. The cache controller of the present invention knows on a repetitive string operation that, when a cache line boundary is reached, depending on whether it is incrementing or decrementing through memory, the next operation will not be in the current cache line contents.

In some embodiments of the present invention, the cache may also be configured to "prefetch" an adjacent cache line entry depending on the direction flag state in preparation for the next repetitive operation. Thus, step 62 may be incorporated into the operation 60, wherein prefetch step 62 must be handled following the rules described above for the appropriate operation.

Figure 6:
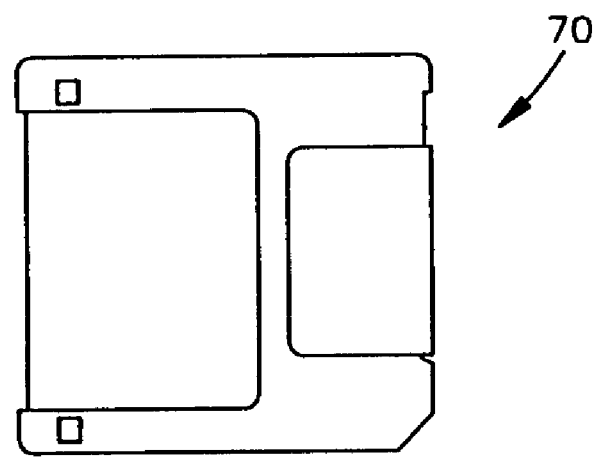
FIG. 6 is an article of manufacture comprising a computer usable medium having a computer readable program according to the present invention embodied in said medium.

FIG. 6 is an illustration of a floppy disc 70. The disc 70 is an exemplary article of manufacture comprising a computer usable medium having a computer readable program according to the present invention as described above.

While preferred embodiments of the invention have been described herein, variations in the design may be made, and such variations may be apparent to those skilled in the art of computer system cache design, as well as to those skilled in other arts. The components, data widths and other parameters above are by no means the only ones suitable for methods and systems according to the present invention, and substitutes will be readily apparent to one skilled in the art. The scope of the invention, therefore, is only to be limited by the following claims.

What is claimed is:

1. A cache controller structure for managing cache access for a computer system, comprising:
   (a) a processor having a direction flag, said processor configured to run a repetitive string operation wherein the string operation is configured to sequentially access a targeted memory block for each repetition depending on the state of the direction flag;
   (b) a cache interfaced with said processor, said cache comprising a plurality of cache lines for accessing system memory data blocks, wherein each cache line comprises a sequential group of data blocks;
   (c) a system memory in communication with said cache and said processor, the system memory comprising a plurality of sequentially ordered data blocks; and
   (d) a cache controller logic element in communication with said processor and said cache, said cache controller logic configured to control access to the cache by said processor;
   wherein said cache controller logic is configured to manipulate the cache lines in said cache responsive to the direction flag and to a position of a targeted memory block within a cache line by:
   filling a cache line prior to a cache line containing the targeted memory block from said system memory when the targeted memory block is at the beginning of the targeted memory block cache line and the direction flag indicates decrementing access; and
   filling a cache line after the targeted memory block cache line when the targeted memory block is at the end of the targeted memory block cache line and said direction flag indicates incrementing access;
   wherein said cache controller logic is configured to not fill the targeted memory block cache line responsive to either a read miss operation or a write miss operation when the targeted memory block is at the beginning of the targeted memory block cache line and the direction flag indicates decrementing access, or when the targeted memory block is at the end of the targeted memory block cache line and said direction flag indicates incrementing access.

2. The cache controller structure of claim 1, wherein said cache controller logic is further configured to flush the targeted memory block cache line responsive to either a read hit operation or a write hit operation when the targeted memory block is at the beginning of the targeted memory block cache line and the direction flag indicates decrementing access, or when the targeted memory block is at the end of the targeted memory block cache line and said direction flag indicates incrementing access.

3. The cache controller structure of claim 1, wherein said cache controller logic is further configured to write the targeted memory block cache line directly to the system memory responsive to a write miss operation when the targeted memory block is at the beginning of the targeted memory block cache line and the direction flag indicates decrementing access, or when the targeted memory block is at the end of the targeted memory block cache line and said direction flag indicates incrementing access.

4. The cache controller structure of claim 1, wherein the processor further has a count register, and wherein said cache controller logic is further configured to manipulate cache lines in said cache responsive to the count register.

5. The cache controller structure of claim 4, wherein responsive to a write miss operation, said cache controller logic is further configured to create a cache line for the targeted memory block cache line when the targeted memory block is at the beginning of the targeted memory block cache line and the direction flag indicates incrementing access, or when the targeted memory block is at the end of the targeted memory block cache line and said direction flag indicates decrementing access.

6. The cache controller structure of claim 1, wherein said cache is either a data-only cache or a combined data and instruction cache.

7. A method for managing cache access for a computer system, comprising the steps of:
   providing a processor having a direction flag;
   providing a cache in communication with said processor, said cache comprising a plurality of cache lines for accessing system memory data blocks, wherein each cache line comprises a sequential group of data blocks;
   providing a system memory in communication with said processor and said cache, the system memory comprising a plurality of sequentially ordered data blocks;
   providing a cache controller logic element in communication with said cache, said cache controller logic configured to control access to the cache by said processor;
   said processor running a repetitive string operation that sequentially accesses a targeted memory block for each repetition depending on the state of the direction flag;
   said cache controller logic manipulating the cache lines in said cache responsive to the direction flag and to a position of a targeted memory block within a cache line by:
   filling a cache line prior to a cache line containing the targeted memory block from said system memory when the targeted memory block is at the beginning of the targeted memory block cache line and the direction flag indicates decrementing access;
   filling a cache line after the targeted memory block cache line when the targeted memory block is at the end of the targeted memory block cache line and said direction flag indicates incrementing access; and
   not filling the targeted memory block cache line responsive to either a read miss operation or a write miss operation when the targeted memory block is at the beginning of the targeted memory block cache line and the direction flag indicates decrementing access, or when the targeted memory block is at the end of the targeted memory block cache line and said direction flag indicates incrementing access.

8. The method of claim 7, further comprising the step of:
said cache controller logic flushing the targeted memory block cache line responsive to either a read hit operation or a write hit operation when the targeted memory block is at the beginning of the targeted memory block cache line and the direction flag indicates decrementing access, or when the targeted memory block is at the end of the targeted memory block cache line and said direction flag indicates incrementing access.

9. The method of claim 7, further comprising the step of:
said cache controller logic writing the targeted memory block cache line directly to system memory responsive to a write miss operation when the targeted memory block is at the beginning of the targeted memory block cache line and the direction flag indicates decrementing access, or when the targeted memory block is at the end of the targeted memory block cache line and said direction flag indicates incrementing access.

10. The method of claim 7, further comprising the steps of:
providing a count register; and
said cache controller logic manipulating the cache lines in said cache responsive to the count register.

11. The method of claim 10, further comprising the step of:
said cache controller logic creating a cache line for the targeted memory block cache line responsive to a write miss operation when the targeted memory block is at the beginning of the targeted memory block cache line and the direction flag indicates incrementing access, or when the targeted memory block is at the end of the targeted memory block cache line and said direction flag indicates decrementing access.

12. The method of claim 7, wherein said cache is either a data-only cache or a combined data and instruction cache.

13. An article of manufacture comprising a computer usable medium having a computer readable program embodied in said medium, wherein the computer readable program, when executed on a computer system comprising a processor having a direction flag, a cache in communication with said processor, said cache comprising a plurality of cache lines for accessing system memory data blocks wherein each cache line comprises a sequential group of data blocks, a system memory in communication with said processor and said cache, the system memory comprising a plurality of sequentially ordered data blacks, and a cache controller in communication with said cache, causes the cache controller to manipulate the cache lines in said cache responsive to the direction flag and to a position of a targeted memory block within a cache line by:

filling a cache line prior to a cache line containing the targeted memory block from said system memory when the targeted memory block is at the beginning of the targeted memory block cache line and the direction flag indicates decrementing access;

filling a cache line after the targeted memory block cache line when the targeted memory block is at the end of the targeted memory block cache line and said direction flag indicates incrementing access; and not filling the targeted memory block cache line responsive to either a read miss operation or a write miss operation when the targeted memory block is at the beginning of the targeted memory block cache line and the direction flag indicates decrementing access, or when the targeted memory block is at the end of the targeted memory block cache line and said direction flag indicates incrementing access.

14. The article of manufacture comprising a computer usable medium having a computer readable program embodied in said medium of claim 13, wherein the computer readable program when executed on the computer system further causes the cache controller to flush the targeted memory block cache line responsive to either a read hit operation or a write hit operation when the targeted memory block is at the beginning of the targeted memory block cache line and the direction flag indicates decrementing access, or when the targeted memory block is at the end of the targeted memory block cache line and said direction flag indicates incrementing access.

15. The article of manufacture comprising a computer usable medium having a computer readable program embodied in said medium of claim 13, wherein the processor has a count register; and wherein the computer readable program when executed on the computer system further causes the cache controller to manipulate the cache lines in said cache responsive to the count register.

16. The article of manufacture of claim 13, wherein the computer readable program when executed on the computer system further causes the cache controller to create a cache line for the targeted memory block cache line when the targeted memory block is at the beginning of the targeted memory block cache line and the direction flag indicates incrementing access, or when the targeted memory block is at the end of the targeted memory block cache line and said direction flag indicates decrementing access.

17. The article of manufacture of claim 13, wherein said cache is either a data-only cache or a combined data and instruction cache.

* * * * *